United States Patent
Hall et al.

(10) Patent No.: US 7,200,987 B2
(45) Date of Patent: Apr. 10, 2007

(54) OFF-AXIS PULSE DETONATION CONFIGURATION FOR GAS TURBINE ENGINE

(75) Inventors: Edward Joseph Hall, Clifton Park, NY (US); Adam Rasheed, Latham, NY (US); Anthony John Dean, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 173 days.

(21) Appl. No.: 10/870,876

(22) Filed: Jun. 18, 2004

(65) Prior Publication Data

US 2005/0279077 A1    Dec. 22, 2005

(51) Int. Cl.
*F02C 5/00*    (2006.01)
*F02G 1/00*    (2006.01)
*F02G 3/00*    (2006.01)

(52) U.S. Cl. ............... 60/39.76; 60/39.38; 60/247
(58) Field of Classification Search ............ 60/804, 60/39.37, 722, 247, 39.38, 39.76
See application file for complete search history.

(56) References Cited

U.S. PATENT DOCUMENTS

| | | | | |
|---|---|---|---|---|
| 2,676,460 A | * | 4/1954 | Brown | 60/742 |
| 3,169,367 A | * | 2/1965 | Hussey | 60/39.37 |
| 3,657,883 A | * | 4/1972 | De Corso | 60/39.37 |
| 4,203,283 A | * | 5/1980 | Weiler | 60/804 |
| 4,418,528 A | * | 12/1983 | Pellow | 60/792 |
| 5,235,812 A | * | 8/1993 | Klaass et al. | 60/727 |
| 5,628,193 A | * | 5/1997 | Kington et al. | 60/752 |
| 6,269,628 B1 | * | 8/2001 | Gates | 60/804 |
| 6,442,930 B1 | * | 9/2002 | Johnson et al. | 60/226.1 |
| 6,477,829 B1 | * | 11/2002 | Hunter et al. | 60/225 |
| 6,886,325 B2 | * | 5/2005 | Norris et al. | 60/39.34 |
| 2004/0112062 A1 | * | 6/2004 | Alkabie | 60/776 |

* cited by examiner

*Primary Examiner*—William H. Rodríguez
(74) *Attorney, Agent, or Firm*—Richard A. DeCristofaro; Patrick K. Patnode

(57) ABSTRACT

The present invention is a gas turbine engine system containing a compressor stage, a pulse detonation stage, and a turbine stage. During operation of the engine system, compressed flow from the compressor stage is directed to at least one off-axis pulse detonation tube in the pulse detonation stage. The off-axis pulse detonation tube detonates a mixture containing the compressed flow and a fuel to create a detonation wave, which is routed to an inlet portion of a reverse flow turbine. The exhaust flow from the reverse flow turbine is then directed away from the engine through ducting.

65 Claims, 1 Drawing Sheet

OFF-AXIS PULSE DETONATION CONFIGURATION FOR GAS TURBINE ENGINE

BACKGROUND OF THE INVENTION

This invention relates to gas turbine engines, and more particularly, to gas turbine engines employing off-axis pulse detonation engines and a reverse flow turbine.

Gas turbine engines, such as those used in aircraft engine applications, typically have three main stages. A compressor stage, a combustion stage and a turbine stage. The compressor stage feeds compressed air flow into the combustion stage, where the compressed flow is combusted with fuel to raise the temperature of the mixture. Subsequent thereto, the combusted mixture enters the turbine stage, where the mixture expands, thus driving the turbine. As the combusted mixture exits the turbine stage, and ultimately the engine, thrust is produced.

However, standard combustion systems use energy release in the combustion process to raise only the temperature of the compressed flow. This represents a very inefficient process of the thermodynamic cycle. No useful work is accomplished, as there is an overall pressure drop in the combustion stage.

In recent years pulse detonation combustion systems have been developed. These systems use compressed air mixed with a fuel to create rapid combustion and compression of a fuel/air mixture. The rapid combustion and compression produce detonation waves, which not only increase the gas temperature, but also provide a meaningful increase in pressure.

Thus, when pulse detonation systems are employed in a gas turbine engine, the increase in pressure can be used to reduce the number of stages or airfoils in the compression stage, and/or can be used to raise the overall cycle pressure ratio. However, one difficulty with the incorporation of pulse detonation systems into gas turbine engines is that the required length of the overall configuration can be undesirable. Current pulse detonation systems are typically longer than existing typical combustor stages. As such, the added length, placed between typical compressor and turbine stages, can be unattractive or impractical for most gas turbine engine applications.

SUMMARY OF THE INVENTION

In an embodiment of the invention, each of the above concerns are addressed by placing at least one pulse detonation combustor system off-axis from the engine, and combining therewith a reverse flow turbine. Such a configuration realizes the benefits provided from pulse detonation systems, while keeping a compact length.

In an embodiment of the invention, a typical compressor stage is employed, and provides a compressed flow to at least one off-axis pulse detonation system. In the pulse detonation system, the compressed flow is mixed with a fuel and the mixture is detonated in the pulse detonation system. The detonation creates a detonation wave with both an increase in pressure and an increase in temperature. The detonation wave is then passed through a transition duct and/or manifold and fed into the inlet portion of a reverse flow turbine, where the flow is used to provide a turning force on a shaft connected to the compressor to turn the compressor blades. The flow from the exit of the reverse flow turbine is then ducted such that it exits the aft portion of the engine, producing thrust.

BRIEF DESCRIPTION OF THE DRAWINGS

The advantages, nature and various additional features of the invention will appear more fully upon consideration of the illustrative embodiment of the invention which is schematically set forth in the figure, in which.

DETAILED DESCRIPTION OF THE PREFERRED EMBODIMENT

Figure 1:
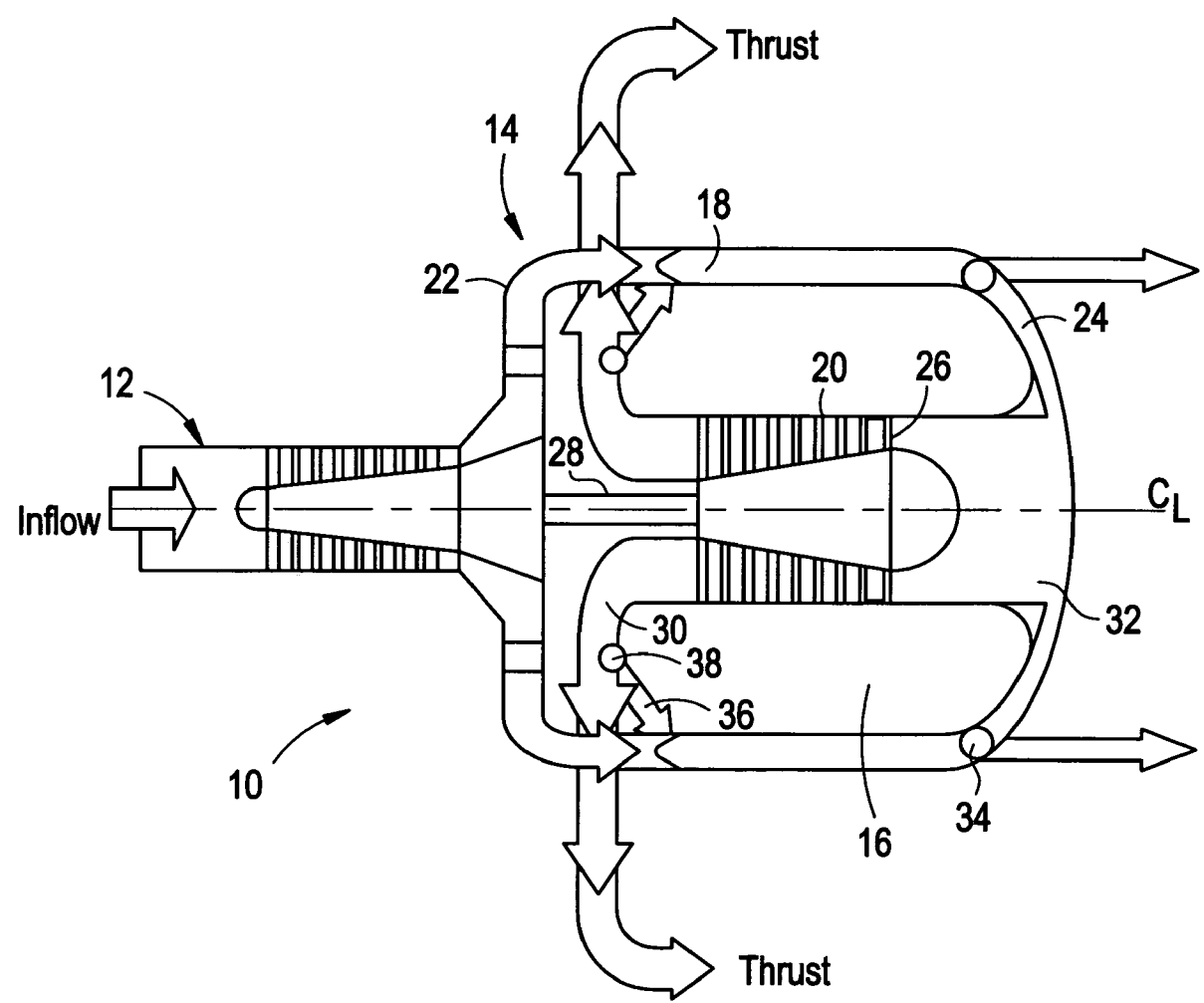
FIG. 1 is a diagrammatical representation of a gas turbine engine incorporating an embodiment of the present invention.

The present invention will be explained in further detail by making reference to the accompanying drawings, which do not limit the scope of the invention, in any way.

FIG. 1 is a diagrammatcal representation of a gas turbine engine 10 incorporating an embodiment of the present invention. The engine 10 contains a compressor stage 12, an off-axis pulse detonation system stage 14, and a turbine stage 16. The compressor stage 12 is configured in accordance with known compressor configurations for gas turbine engines. However, it is understood that the configuration of the compressor stage 12 can be altered to optimize the performance of the engine 10, or the overall size can be reduced to take advantage of the increases in pressure provided by the off-axis pulse detonation system stage 14. The off-axis pulse detonation system stage 14 comprises at least one off-axis pulse detonation tube 18, which detonates a mixture of the compressed gas from the compressor stage 12 and fuel. The detonation waves from the off-axis pulse detonation tube(s) 18 are then ducted to a reverse flow turbine 20 in the turbine stage 16, the flow from which is then ducted downstream of the engine 10 producing thrust. Further, as shown in FIG. 1, in an embodiment of the present invention, the off-axis pulse detonation tube(s) 18 are positioned such that at least a portion of the tube(s) are located at a same station plane as the turbine 20, along the engine 10 axis. Stated differently, in this embodiment, there is at least some overlap of position of the tube(s) 18 and the turbine 20. Such a configuration allows for the reduction in overall length of the engine 10.

The operation and configuration of the system of the present invention will now be discussed in more detail.

During the operation of the engine 10, a flow of gas, typically air, will enter the compressor stage 12, where the pressure of the gas is increased. The compressed gas then exits the compressor stage 12 and is ducted through a series of bifurcated ducts 22 to at least one off-axis pulse detonation tube 18. In another embodiment, there are a plurality of off-axis pulse detonation tubes 18, distributed axially around the engine 10. In a further embodiment having a plurality of pulse detonation tubes 18, the pulse detonation tubes 18 are distributed symmetrically around the engine 10.

Before, or as, the compressed gas enters the off-axis pulse detonation tube 18, a fuel is added to the flow, providing a fuel/gas mixture. The fuel/gas mixture is then detonated in the off-axis pulse detonation tube 18 in accordance with the typical operation of pulse detonation engines and tubes. The detonation in the pulse detonation tube can be initiated by any known means or methods including, but not limited to direct energy injection or other periodic energy focus mechanism. Non-limiting examples include spark ignition and shock focusing.

The off-axis pulse detonation tube 18 is positioned off of the centerline $C_L$ of the engine 10 at a distance sufficient to avoid interference with the reverse flow turbine 20 and provide adequate geometry for the bifurcated ducts 22, the secondary duct system 24 and the exhaust ducts 30, to ensure adequate flow through the components of the engine 10. Additionally, in another embodiment of the present invention, rather than being parallel with the centerline of the engine 10, the off-axis pulse detonation tube 18 is angled with respect to the centerline $C_L$ of the engine 10, so as to optimize flow through the components of the engine 10, and to optimize positioning and efficiency of the ducting of the engine 10.

The resultant pressure waves produced by the off-axis pulse detonation tube 18 elevate both the pressure and temperature of the fuel/gas mixture. The detonated waves then exit the off-axis pulse detonation tube 18 and pass through a secondary duct system 24 which redirects the detonation waves upstream in the engine 10 to an inlet 26 of a reverse flow turbine 20. In an embodiment of the invention the flow is changed 180 degrees from the exit of the off-axis pulse detonation tube 18 into the inlet 26 of the turbine 20. The reverse flow turbine 20 is of the axial or axial/radial type and is connected by a shaft 28 to the compressor stage 12. The reverse flow turbine 20 is positioned within the engine 10 so that the inlet 26 of the turbine is located aft in the engine 10 of the exit of the reverse flow turbine 20. Stated differently, the flow of the reverse flow turbine is opposite that of the flow entering the compressor stage 12.

In an embodiment of the present invention, the secondary duct system 24 is configured so as to control shock reflection from the duct back into the pulse detonation chamber of the off-axis pulse detonation tube 18 to prevent the choking of the detonation waves through the tube. In another embodiment, the secondary duct system 24 is configured so as to create a shock wave which resonates upstream within the off-axis pulse detonation tube at a frequency which allows the reverberated shock wave to be used to aid the initiation of the detonation in a resonator of the detonation tube 18.

Additionally, the secondary duct system 24 is configured so as to minimize the impact forces of the detonation waves as the waves enter the input 26 of the reverse flow turbine 20. In one embodiment, a manifold structure 32 is provided between the secondary duct system 24 and the inlet 26 of the turbine 20. The manifold structure 32 is used to stabilize and combine the detonation waves from the off-axis pulse detonation tube so as to minimize any shock or impact forces on the inlet 26 of the turbine 20. Further, in an additionally embodiment, where a plurality of off-axis pulse detonation tubes 18 are employed, the manifold structure 32 is used to combine and stabilize the detonation waves from each of the detonation tubes 18.

In another embodiment with a plurality of tubes 18, the manifold structure 32 is configured so prevent or minimize having detonation waves from the tubes 18 resonate up through the secondary duct system 24 of other pulse detonation tubes 18. In one embodiment this is accomplished through the use of mechanical valves or a flow control device which prevents the back-flow of detonation waves back through the secondary duct system 24 into the pulse detonation tubes 18.

Further, in an embodiment where a plurality of pulse-detonation tubes 18 are employed, the timing and frequency of the detonations in each of the tubes 18 are timed so as to optimize performance of the engine 10 and reverse flow turbine 20, as well as minimize the shock forces generated from the plurality of detonation waves being directed to the inlet 26 of the turbine 20.

In an additional embodiment, a valve system 34 is employed to direct a portion of the detonation wave out of the secondary duct system 24 so as to provide some exhaust or thrust from the detonation wave itself, whereas the remaining portion of the detonation wave is directed to the inlet 26 of the turbine 20. The valve system 34 is controlled so as to optimize overall engine 10 performance. During certain engine 10 operations the valve system 34 can be fully open or closed, or can be at a partially open setting. In one embodiment, the valve system 34 is automatically controlled so that as the operational demands and requirements of the engine 10 change the valve system 34 is automatically controlled to maximize performance. This is done by sending all of the detonation wave to the turbine 20, or by allocating some of the detonation wave to the turbine 20 and the rest to exit the ducts 24. For example, to provide additional thrust to the engine 10.

Turning now to the flow in the turbine 20, as the flow passes through the reverse flow turbine 20, it expands, which drives the blades of the turbine turning the shaft 28, thus driving the compressor stage 12. In another embodiment, the energy of the turning shaft 28 is used to provide power to other peripheral devices coupled to the engine 10.

After the flow exits the reverse flow turbine 20, it is again redirected through exhaust ducts 30, which are configured to redirect the flow in a downstream direction of the engine 10, thus producing thrust. In another embodiment, the exhaust ducts 30 direct the flow in a direction other than the downstream direction of the engine 10, depending on the application of the engine.

In one embodiment, bypass flow (an example is air) is provided from either the compressor stage 12 or from additional exterior flow passing over, or by, the engine 10 to the cool the off-axis pulse detonation tube 18. Because of the off-axis nature of the off-axis pulse detonation tube 18, using bypass air as a cooling method is simpler than in traditional axial configurations where the combustion chamber is positioned axially with the compressor stage 12. The bypass flow can also be used aid in the cooling of the reverse flow turbine 20. In one embodiment, the bypass flow is passed through a manifold or other structure (not shown) which allows the bypass air to cool both the off-axis pulse detonation tube 18 and the exterior of the reverse flow turbine 20, simultaneously. In another embodiment, the bypass flow is controlled through a flow control device which can change the allocation and/or direction of the flow depending on the operational needs of the engine 10. For example, in a particular operational situation it may be necessary to maximize, minimize or stop the cooling flow to one or both of the turbine 20 and pulse detonation tube 18.

In another embodiment of the present invention, a portion of the flow exiting the reverse flow turbine 20 is re-directed back into the bifurcated ducts 22 through a turbine exhaust bleed duct 36, which directs a portion of the flow from the turbine 20 to the off-axis pulse detonation tube 18. This re-directed turbine flow is used to provide cycle benefits for the detonation processes of the tube 18. In an alternative embodiment, the flow of turbine exhaust gases into the bleed duct 36 is controlled by a bleed valve system 38, which controls the flow based on desired operational characteristics and requirements of the engine 10.

Further, in an additional embodiment, a portion of the compressed flow, exiting the compressor stage 12 is rerouted to cool the reverse flow turbine 20. Moreover, this compressed flow can also be employed to cool various other components within the engine 10, including the exhaust ducts 30. In a further embodiment, the flow of the rerouted compressor flow is controlled via a valve control system. Thus, during certain engine 10 performance situations the maximum amount of compressed flow is sent directly to the pulse detonation tube 18, whereas during other engine 10 operations, a maximum amount of compressed flow is directed to cooling the turbine 20.

In yet another embodiment, the reverse flow turbine 20 is cooled radially by at least some bypass air flow, and centrally through the use of a portion of the compressed flow exiting the compressor stage 12. This configuration, provides for cooling of the turbine 20 from both its exterior and interior.

In an additional embodiment of the present invention, a normal turbine stage is combined with a reverse flow combustion stage. In this embodiment, the turbine stage is typically configured so that the exhaust portion of the turbine is pointing aft. Such a configuration aids in preventing any thrust loss due to the ducting and rerouting of the turbine exhaust. Further, the combustion portion of the engine remains off-axis, as shown in FIG. 1, however, the flow within the off-axis pulse detonation tube is reversed in that it flows from aft to forward (as these directions are depicted in FIG. 1). Then, after detonation, the detonation wave enters the inlet of the turbine stage 16, which is oriented normally. In an embodiment, the compressed flow is turned 180 degrees prior to entering an inlet of the combustion portion of the engine.

Moreover, it is contemplated that the present invention be employed in turboprop and turboshaft engines, where engine power is converted to rotational shaft power. Typical turboprop and turboshaft engines employ Brayton-cycle based combustion configurations. However, the thermodynamic efficiency of pulse detonation combustors is improved over the deflagration currently used in Brayton-cycle engines. In the present invention, the gas generator (i.e. combustor and compressor spool) in turboshaft/prop engines can be partially, or completely, replaced by the engine 10 of the present invention, using off-axis pulse detonation combustors.

In each application, the shaft power for the rotor (i.e. turboshaft engine) and the propeller (i.e. turboprop engine) is, at least partially, attained from the turbine stage 16.

While the invention has been described in terms of various specific embodiments, those skilled in the art will recognize that the invention can be practiced with modification within the spirit and scope of the claims. Namely, although the present invention has been discussed in the context of aircraft engine applications, it is contemplated that the present invention can be employed in all applications that use gas turbine engines, or the like.

What is claimed is:

1. A turbine engine system comprising:
   a compressor stage which provides a compressed flow;
   at least one combustion device, comprising a pulse detonation chamber coupled to said compressor stage which receives at least a portion of said compressed flow and combusts a mixture comprising said compressed flow and a fuel; and
   a turbine coupled to said at least one combustion device where said turbine receives at least a portion of said combusted mixture,
   wherein said at least one combustion device is positioned radially from a centerline of both said compressor stage and said turbine and wherein said at least one combustion device and said turbine at least partially overlap in an axial direction.

2. The turbine engine system of claim 1, wherein said at least one combustion device receives all of said compressed flow.

3. The turbine engine system of claim 1, wherein said turbine receives all of said combusted mixture from said at least one combustion device.

4. The turbine engine system of claim 1, wherein said compressor stage and said turbine share said centerline.

5. The turbine engine system of claim 1, wherein a plurality of said at least one combustion devices are positioned radially with respect to said centerline.

6. The turbine engine system of claim 1, wherein said turbine is coupled to said compressor stage via a shaft.

7. The turbine engine system of claim 1, wherein a direction of flow of said combusted mixture is changed 180 degrees from said at least one combustion device to an inlet of said turbine.

8. The turbine engine system of claim 1, wherein a centerline of said at least one combustion device is parallel to said centerline.

9. The turbine engine system of claim 1, wherein at least a portion of exhaust from said turbine is directed to flow in a same direction as a flow entering said compressor stage.

10. The turbine engine system of claim 1, wherein said portion of combusted mixture passes through a manifold prior to entering an inlet of said turbine.

11. The turbine engine system of claim 1, wherein another portion of said combusted mixture is directed away from said turbine.

12. The turbine engine system of claim 11, wherein said another portion of said combusted mixture is directed in a same direction as a flow entering said compressor stage.

13. The turbine engine system of claim 1, wherein another portion of said compressed flow is directed to cool said turbine.

14. The turbine engine system of claim 1, wherein a bypass flow is provided to cool at least one of said at least one combustion device and said turbine.

15. The turbine engine system of claim 1, wherein a portion of an exhaust from said turbine is directed into said portion of compressed flow received by said at least one combustion device.

16. The turbine engine system of claim 1, wherein an exhaust flow from said turbine exits said turbine in a direction which is 180 degrees from a direction of a flow entering said compressor stage.

17. The turbine engine system of claim 1, wherein said fuel is mixed with said portion of compressed flow prior to entering said combustion device.

18. An aircraft engine comprising the turbine engine system of claim 1.

19. The turbine engine system of claim 1, wherein said turbine is a reverse flow turbine.

20. The turbine engine system of claim 1, wherein said combustion device is a reverse flow combustion device.

21. The turbine engine system of claim 1, wherein said turbine engine system is part of one of a turboprop or turboshaft engine.

22. The turbine engine system of claim 1, wherein a direction of flow of said portion of said compressed flow is changed 180 degrees from said compressor stage to an inlet of combustion device.

23. A turbine engine system comprising:
   a compressor stage which provides a compressed flow;
   a plurality of combustion devices coupled to said compressor stage, each one of which receives at least a portion of said compressed flow and combusts a mixture comprising said compressed flow and a fuel, and wherein at least one of said plurality of combustion devices is a pulse detonation chamber; and a turbine coupled to said plurality of combustion devices where said turbine receives at least a portion of said combusted mixture, wherein at least one of said plurality of combustion devices is positioned radially from a centerline of both said compressor stage and said turbine and wherein at least one of said plurality of combustion devices and said turbine at least partially overlap in an axial direction.

24. The turbine engine system of claim 23, wherein each of said plurality of combustion devices is a pulse detonation chamber.

25. The turbine engine system of claim 23, wherein said plurality of combustion devices receive all of said compressed flow.

26. The turbine engine system of claim 23, wherein said turbine receives all of said combusted mixture from said plurality of combustion devices.

27. The turbine engine system of claim 23, wherein said compressor stage and said turbine share said centerline.

28. The turbine engine system of claim 23, wherein said plurality of said combustion devices are positioned radially with respect to said centerline.

29. The turbine engine system of claim 23, wherein said turbine is coupled to said compressor stage via a shaft.

30. The turbine engine system of claim 23, wherein a direction of flow of said combusted mixture is changed 180 degrees from at least one of said plurality of combustion devices to an inlet of said turbine.

31. The turbine engine system of claim 23, wherein a centerline of at least one of said plurality of said combustion devices is parallel to said centerline.

32. The turbine engine system of claim 23, wherein at least a portion of exhaust from said turbine is directed to flow in a same direction as a flow entering said compressor stage.

33. The turbine engine system of claim 23, wherein said portion of combusted mixture from at least one of said combustion devices passes through a manifold prior to entering an inlet of said turbine.

34. The turbine engine system of claim 23, wherein another portion of said combusted mixture is directed away from said turbine.

35. The turbine engine system of claim 34, wherein said another portion of said combusted mixture is directed in a same direction as a flow entering said compressor stage.

36. The turbine engine system of claim 23, wherein another portion of said compressed flow is directed to cool said turbine.

37. The turbine engine system of claim 23, wherein a bypass flow is provided to cool at least one of said turbine and one of said combustion devices.

38. The turbine engine system of claim 23, wherein a portion of an exhaust from said turbine is directed into said portion of compressed flow received by said plurality of combustion devices.

39. The turbine engine system of claim 23, wherein an exhaust flow from said turbine exits said turbine in a direction 180 degrees from a direction of a flow entering said compressor stage.

40. The turbine engine system of claim 23, wherein said fuel is mixed with said portion of compressed flow prior to entering said plurality of said combustion devices.

41. The turbine engine system of claim 23, wherein said plurality of said combustion devices are positioned symmetrically.

42. An aircraft engine comprising the turbine engine system of claim 23.

43. The turbine engine system of claim 23, wherein said turbine is a reverse flow turbine.

44. The turbine engine system of claim 23, wherein at least one of said combustion devices is a reverse flow combustion device.

45. The turbine engine system of claim 23, wherein each of said combustion devices is a reverse flow combustion device.

46. The turbine engine system of claim 23, wherein said turbine engine system is part of one of a turboprop or turboshaft engine.

47. The turbine engine system of claim 23, wherein a direction of flow of said portion of said compressed flow is changed 180 degrees from said compressor stage to said plurality of combustion devices.

48. A turbine engine system comprising:

a compressor stage which provides a compressed flow;

a plurality of pulse detonation chambers coupled to said compressor stage which receive said compressed flow and combust a mixture comprising said compressed flow and a fuel; and a turbine coupled to said plurality of combustion devices where said turbine receives said combusted mixture, wherein each of said plurality of pulse detonation chambers is positioned radially from a centerline of both said compressor stage and said turbine and wherein each of said plurality of pulse detonation chambers and said turbine at least partially overlap in an axial direction.

49. An aircraft engine comprising the turbine engine system of claim 48.

50. The turbine engine system of claim 48, wherein said plurality of pulse detonation chambers receive all of said compressed flow.

51. The turbine engine system of claim 48, wherein said turbine receives all of said combusted mixture.

52. The turbine engine system of claim 48, wherein said compressor stage and said turbine share said centerline.

53. The turbine engine system of claim 48, wherein said plurality of pulse detonation chambers are positioned symmetrically with respect to said centerline.

54. The turbine engine system of claim 48, wherein a direction of flow of said combusted mixture is changed 180 degrees from said at least one combustion device to an inlet of said turbine.

55. The turbine engine system of claim 48, wherein a centerline of all of said pulse detonation chambers is parallel to said centerline.

56. The turbine engine system of claim 48, wherein said combusted mixture passes through a manifold prior to entering an inlet of said turbine.

57. The turbine engine system of claim 48, wherein a portion of said combusted mixture is not directed to an inlet of said turbine.

58. The turbine engine system of claim 48, wherein a portion of said compressed flow is not directed to said plurality of pulse detonation chambers.

59. The turbine engine system of claim 48, wherein a portion of an exhaust flow from said turbine is directed into said compressed flow.

60. The turbine engine system of claim 48, wherein an exhaust flow from an exit of said turbine exits said turbine in a direction 180 degrees to a flow entering said compressor stage.

61. The turbine engine system of claim 48, wherein said turbine is a reverse flow turbine.

62. The turbine engine system of claim 48, wherein at least one of said pulse detonation chambers is a reverse flow pulse detonation chamber.

63. The turbine engine system of claim 48, wherein each of said pulse detonation chambers is a reverse flow pulse detonation chamber.

64. The turbine engine system of claim 48, wherein said turbine engine system is part of one of a turboprop or turboshaft engine.

65. The turbine engine system of claim 48, wherein a direction of flow of said portion of said compressed flow is changed 180 degrees from said compressor stage to said plurality of pulse detonation chambers.

* * * * *